United States Patent [19]

Poff

[11] 4,363,243

[45] Dec. 14, 1982

[54] STRAIN GAGE MEASUREMENT CIRCUIT FOR HIGH TEMPERATURE APPLICATIONS USING DUAL CONSTANT CURRENT SUPPLIES

[75] Inventor: Ronald I. Poff, West Covina, Calif.

[73] Assignee: Eaton Corporation, Cleveland, Ohio

[21] Appl. No.: 259,565

[22] Filed: May 1, 1981

[51] Int. Cl.³ .............................................. G01B 7/16
[52] U.S. Cl. ......................................... 73/766; 338/3
[58] Field of Search ............... 73/766, 862.65, 862.35, 73/763, 764, 765, 767, 768, 769, 770, 771, 772, 773, 774, 775, 776, 777, 778, 779, 780; 338/3

[56] References Cited

U.S. PATENT DOCUMENTS 3,355,935 12/1967 Grosvalet ............................. 73/777
3,662,234 5/1972 Ishii ................................... 73/777 X Primary Examiner—Jerry W. Myracle
Attorney, Agent, or Firm—Kevin Redmond

[57] ABSTRACT

A measurement circuit and calibration technique for temperature compensating a half-bridge-high-temperature strain gage, capable of providing data which is independent of cable resistance variations.

The need for a compensating resistor is eliminated and the cable conductors are removed from the measurement circuit. The output signal is easily and accurately converted to a measurement of strain without the need for auxiliary measurement required with prior art circuitry.

6 Claims, 2 Drawing Figures

STRAIN GAGE MEASUREMENT CIRCUIT FOR HIGH TEMPERATURE APPLICATIONS USING DUAL CONSTANT CURRENT SUPPLIES

BACKGROUND

1. Field

This invention pertains to measurement circuits for half-bridge resistance strain gages and, more particularly, to dual current excitation for such circuits designated to provide data which is insensitive to changes in cable resistance and to temperature induced changes in strain gage resistance.

2. Prior Art

FIG. 1 illustrates a prior art strain gage measurement circuit configured in a conventional Wheatstone bridge circuit comprising an active resistor (RA) 101, a dummy resistor (RD) 102, a first completion resistor (RCA) 107, and a second completion resistor (RCB) 108.

In a typical application, the active and dummy resistors are attached to a member which is subject to strain; however, the strain is transmitted only to RA. This member is often located in a high temperature area, making it necessary to remotely locate the remainder of the circuitry. For example, the completion resistors are typically located remotely from the active and dummy resistors by means of leads which are represented in FIG. 1 by their equivalent resistances (RLA) 103A, (RLB) 103B and (RLC) 103C. FIG. 1 also shows a temperature compensating resistor (RTC) 105 and a balancing resistor (RBAL) 106 placed in series between lead 103A and RCA to aid in temperature compensating the bridge. Power for the bridge is supplied from a source 110 and is applied to the bridge at the junction of the balancing resistor and the temperature compensating resistor, and at the junction of the lead 103B and the completion resistor RCB. The bridge output voltage is measured at terminals 109 which are located in series with lead 103C and the junction of the completion resistors RCA and RCB. It should be noted that although the leads 103A, 103B and 103C are drawn as separate lines, all are usually conductors of a single cable.

In a fundamental Wheatstone bridge circuit, there are only four resistors, configured in the same way as RA, RD, RCA and RCB. The circuit of FIG. 1 can be viewed as such a circuit by considering the value of all other resistors as zero. In the operation of this circuit, the bridge is initially adjusted to provide an output voltage at terminals 109 of zero volts.

This is referred to as zero setting or zeroing. To zero set the bridge, the voltage produced at the junction of the RA and RD must be equal to the voltage produced at the junction of RCA and RCB. Since RA and RD form a first voltage divider supplied by source 110, and RCA and RCB form a second voltage divider supplied by the same source, the following relationship may be written:

$$RA/(RA+RD)=RCA/(RCA+RCB), \text{ and} \quad (1)$$

$$RD/(RA+RD)=RCB/(RCA+RCB) \quad (2)$$

By dividing these two equations the following equation results:

$$RA/RD=RCA/RCB \quad (3)$$

Equation (3) is a well known equation showing the relationship of the resistance in each arm of the Wheatstone bridge. In the most common applications of the Wheatstone bridge, the value of an unknown resistance is found by inserting it in the bridge circuit to form one arm of the bridge. The value of one or more of the other known resistances in the bridge arms is then varied to produce a zero voltage output. The resulting values of the known resistors, after adjustment, are substituted in Equation (3) to find the value of the unknown resistor. In strain gage applications, the bridge is used in a different manner, but the equations still applies. In strain gage applications, the resistances are all known values, but the active element is placed under strain (elongated or compressed) by bonding or welding it to a structural member under test which is subject to a strain. The resistance of the active element, RA, changes in a known manner as it is strained, making a measurement of its resistance an indicator of the strain being experienced by the member under test. The measurement of the change of resistance of the active element is made by measuring the change in the output voltage. Unlike the conventional use of the bridge, no attempt is made to zero the bridge after the initial zeroing.

The output voltage is given by the difference between the two voltage divider outputs:

$$E_{out} = E_{in}\frac{RA}{R_A + R_D} - \frac{RCA}{RCA + RCB} \quad (4)$$

The change in output voltage with respect to the change in the active resistance is found by differentialing equation (4):

$$\frac{dE_{out}}{dR_A} = \frac{E_{in} R_D}{R_A + R_D 2} \quad (5)$$

A gage factor, F, is defined as follows:

$$F = \frac{dR_A/R_A}{DL/L} \quad (6)$$

Where:
  $dR_A$ = The change in the resistance RA
  $R_A$ = The value of resistance of the active resistor
  $dL$ = The change in the length of the member strained
  $L$ = The length of the member over which the strain is measured.

The strain gage factor may be considered as the ratio of the percent change in the resistance of $R_A$ to the percent change in length of the member under test. Substituting the gage factor F into Equation (5), we have:

$$dE_{out} = E_{in}\frac{RA \cdot RD}{(RA + RD)^2} F \frac{dL}{L} \quad (7)$$

Where RA and RD are equal, Equation (7) reduces to:

$$dE_{out} = \frac{E_{in}F}{4} \frac{dL}{L} \quad (8)$$

If the bridge is zeroed first, Equation (8) represents the output voltage $E_{out}$ as indicated in Equation (9)

$$E_{out} = \frac{E_{in}F}{4} \frac{dL}{L} \quad (9)$$

Where the active resistor is subject to a temperature that differs from that of the dummy resistor, or these resistors have a different temperature coefficient, the circuit may be compensated by using a temperature compensating resistor RTC 106. However, the addition of the RTC upsets the zero balance of the bridge. To overcome this and balance the bridge, the balancing resistor, RBAL 106 is added. In practical circuit, the RTC and RBAL are small in comparison to the other resistors in the bridge. For example, the active, dummy and completion resistors are typically in the order of 120 ohms, while the temperature compensating and balancing resistors are typically 15 ohms.

Although the prior art circuitry is commonly used, it presents a number of serious problems in obtaining accurate results. The principal problem occurs when both the gage elements and the cable are subjected to varying temperatures which change their resistances by very sizeable amounts. Despite the fact that the cable resistances 103A, 103B and 103C in each leg approximately track each other, the effects of heating in the two arms of the bridge to which 103A and 103C are connected are not simply accounted for. The reason for this can be understood by noting that the contribution of each bridge arm to the output signal is proportional to its change in resistance divided by its total original resistance or $\Delta R/R$. Even though $\Delta R$ may be the same in both arms of the bridge, R never is the same so that $\Delta R/R$ is different for the two arms, resulting in a zero shift or apparent strain signal from merely heating more or less cable than was heated during temperature calibration.

Unfortunately, the temperature compensating resistor RTC 105 exaggerates this effect and the magnitude of the error is impossible to theoretically predict to an acceptable accuracy, making it necessary to characterize the gage and cable by measurement with different amounts of cable held at elevated temperatures. Such measurements provide an apparent strain which depends on gage temperature and actual cable resistance. The variable cable resistance also changes the strain sensitivity of the active arm of the bridge, making knowledge of the cable resistance important for accurate results. It is not convenient to measure these resistances because the gage portion of the bridge must be disconnected from the remainder of the bridge.

The measurement of the cable resistances can be simplified by adding additional leads, referred to as cable conductors, to enable the cable resistance to be measured directly without disconnecting the cable leads, but data reduction is complicated and true compensation is usually not obtained, except in very controlled circumstances of cable heating, not often achieved in practical cases.

SUMMARY

An object of the present invention is to eliminate the effect of cable heating on the output signal from the strain gage. An object of the present invention is to achieve accurate and repeatable temperature compensation.

An object of the present invention is to obtain consistent strain sensitivity over wide temperature ranges.

The present invention is designed to eliminate the numerous sources of error signals which normally occur in a half bridge high temperature strain gage. The commonly used Wheatstone bridge circuit necessitates cable resistances inside and bridge where they can cause large zero setting shifts as the cable resistance changes with temperature. In addition, the gage is desensitized by the cable resistance in series with the strain sensing element. Both these effects depend on the length of cable attached to the gage, the temperature to which the cables are heated, and the value of the gage resistances. Each gage and cable combination functions differently, making individual bridge characterization for various conditions necessary. In addition, the necessary measurements are inconvenient because the gage must be disconnected from the bridge circuit.

A dual current supply circuit incorporated in the circuit of the present invention excites the two gage elements independently to permit the output signals to be independently adjusted and matched. The result of this arrangement is a reasonably constant zero output over a wide temperature range, a primary goal of temperature compensation. The present invention also eliminates the need for a compensating resistor and removes the cable conductors from the measurement circuit, both of which are significant advantages. In addition, the output signal is easily and accurately converted to a measurement of strain without the need for auxiliary measurements required with prior art circuitry.

DETAILED DESCRIPTION OF THE INVENTION

Figure 1:
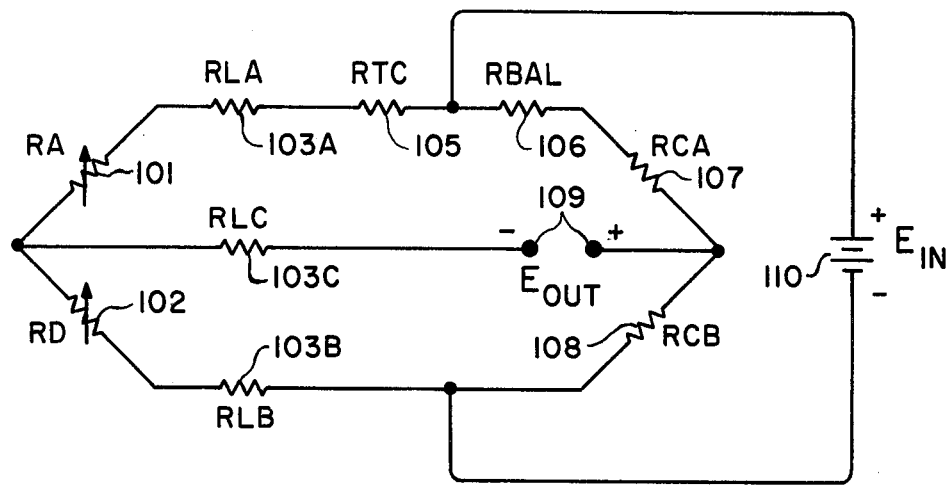
FIG. 1 is a commonly used strain gage measurement circuit including a half bridge gage and a three conductor cable.
Figure 2:
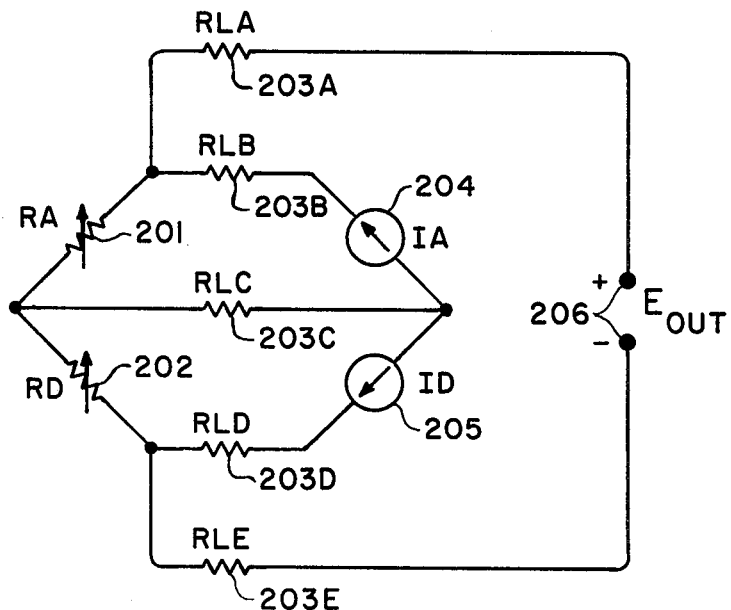
FIG. 2 is a schematic diagram of the present invention which includes a half bridge strain gage circuit, a five conductor cable and two constant current power supplies.

The schematic diagram of the present invention, shown in FIG. 2, comprises an active resistor (RA) 201, a dummy resistor (RD) 202, a constant current power supply for the active resistor (IA) 204, and a constant current power supply for the dummy resistor (ID) 205. The power supplies and an external means for measuring the output voltage, $E_{out}$, of the bridge are connected to the active and dummy resistor by means of five leads represented by their respective resistances RLA through RLE, designated by drawing numerals 203A through 203E. The leads RLA and RLE connect the terminals 206 to one terminal of RA and one terminal of RD respectively, while RLB, RLC and RLD connect the power supplies to RA and RD. Terminals 206 are used to measure the bridge output voltage. In many respects, this circuit resembles that of the commonly used bridge circuit of FIG. 1, with the exception that the constant current power supplies replace the completion resistors.

However, on closer inspection, it can be seen that the dual constant current power supply circuit is not actually a bridge. Instead, it comprises two resistance loops, one of which consists of the active resistor RA and its constant current supply, while the other consists of the dummy resistor ED and its constant current supply. Unlike a bridge, the currents flow in opposite directions in RA and RD to provide a positive voltage at the outside terminals of RA and RD with respect to their common terminal. This arrangement permits the subtraction of the voltages across these resistors as an output signal. The output voltage, $E_{out}$, is measured directly using a high impedance meter connected to leads 203A and 203E. The absolute value of the voltages at the outside terminals of RA and RD will float up and down with respect to the common terminal of the supplies, as the center lead wire, RLC, changes resistance due to cable heating; however, these voltages will change by the same amount since they both have the lead, RLC, as a common element. Since RLC is a common element, its resistance has no effect on the difference voltage, $E_{out}$, and accordingly, $E_{out}$ becomes independent of cable resistance. The apparent strain due to cable resistance change has been eliminated by essentially taking the cable outside the measurement circuit.

The system illustrated in FIG. 2 may also be employed to aid in zero setting and in temperature compensation of the strain gage circuit.

In order to obtain a zero output voltage, it is necessary to make the voltage across RA and RD equal, which may be accomplished by adjusting the currents of IA and ID. It is convenient to use a predetermined value of current for IA, since this will determine the strain sensitivity of the circuit, but in fixing IA, the zero setting must be made by varying ID alone.

Zero setting by using ID alone is possible as illustrated by the following analysis. Assuming a fixed value of resistance for RA, the voltage across RA referred to as $E_A$ is then fixed at $E_A = IA \times RA$. The resistance RD may be larger than RA enabling ID to be proportionally smaller than IA. The voltage across RD is then $E_D = ID \times RD$, and the output voltage is zero when $E_{out} = E_D - E_A = I_D \times RD - E_A = 0$, which indicates that the value of current from ID can be adjusted to accomplish the desired result of setting the output to zero.

Although the above described analytical steps can also be considered as providing an advantageous zeroing procedure, it is possible to obtain an even more important advantage if the zeroing feature is not used. Temperature compensation over a range may be obtained by adjusting ID to provide a nearly constant zero offset, rather than an initial zero setting. This serves to temperature compensate the gage by eliminating the normally large apparent strain which is caused by the differences in the resistance versus temperature characteristics of RA and RD. In this temperature compensation technique, the change in voltage over a temperature range is made equal in both arms. The change in voltage across RA is equal to the current through RA multiplied by the change in resistance or $\Delta E_A = IA \times \Delta RA$. With a knowledge of the change in $E_A$ as RD changes over a change in temperature, ID may be adjusted so that the change in voltage across RA is equal to that across RD, or $E_D = ID \times \Delta RD = \Delta E_A$. This adjustment of ID compensates the gage over a specific temperature range because it is the difference $E_A$ and $E_D$ that is measured. An equal change in $E_A$ and $E_D$ has no effect on $E_{out}$ leaving it uneffected by the change in RA and RD.

By choosing the proper resistance material for RA, it is possible, when using the present invention, to obtain a constant gage sensitivity. As noted earlier, the strain gage factor is given by Equation (6) which is repeated below for convenience:

$$F = \frac{dRA/RA}{dL/L} \tag{6}$$

Equation (6) may be rewritten by substituting $\Delta$ for d as follows:

$$F = \frac{\Delta RA/RA}{\Delta L/L} = \frac{RA/RA}{\epsilon} \tag{6A}$$

Where: $\epsilon = \Delta L/L$

Typically, strain gages lose sensitivity as the temperature increases. That is, the output voltage decreases for the same strain (or $\epsilon$) because RA increases but $\Delta RA$ due to strain does not. In the conventional bridge shown in FIG. 1, the change in output voltage due to strain is directly proportional to F and therefore directly proportional to $\Delta RA/RA$, as indicated by Equations (6A) and (9). In the present invention, the output voltage is not proportional to $\Delta RA/RA$. It is proportional to $\Delta RA$ alone because the current through RA is constant and unaffected by changes in the value of RA. This will be shown to be a significant advantage when used in conjunction with the proper active resistance material.

The resistance of platinum tungsten wire alloy increases with an increase in temperature at a rate which almost perfectly cancels the corresponding gage factor loss as a function of temperature. At 1200° F. the gage factor loss due to temperature is 20.2% or the gage factor is only 0.798 times the room temperature value. This characteristic combined with the gage factor loss makes the absolute resistance change due to a given strain almost constant over the entire temperature range. This can be seen by noticing that when the loss factor (0.798) is multiplied by the resistance gain factor (1.25) we get $$(0.798) \times (1.25) = 0.9975$$

Since the factor is unity at room temperature, this small drop amounts to only one-fourth of one percent loss in strain sensitivity at 1200° F. In addition, no RTC resistors are required nor are there any varying cable resistances to affect the gage factor. With this feature, the present invention provides a constant relationship between strain and the signal voltage, $E_{out}$, over a wide range of temperatures.

Having described my invention, I claim:
1. A strain gage circuit, comprising:
    (a) a first resistor referred to as the active resistor having two terminals, the active resistor being subject to an applied strain force which produces an accompanying change in the value of its resistance,
    (b) a second resistor, referred to as the dummy resistor, having two terminals, the dummy resistor having one terminal connected to a terminal of the active resistor to form a first junction,
    (c) a first constant current power supply having two terminals,
    (d) a second constant current power supply having two terminals, one terminal of which is connected to a terminal of the first power supply having a like polarity to form a second junction,
    (e) first means for connecting which joins the unconnected terminal of the first power supply to the unconnected terminal of the active resistor to form a third junction, (f) second means for connecting which joins the unconnected terminal of the second power supply to the unconnected terminal of the dummy resistor to form a fourth junction, (g) third means for connecting which joins the first and second junctions, and (h) fourth means for connecting which joins the third and fourth junctions to a means for measuring voltage, the means for measuring voltage being of the type which has an internal impedance substantially higher than resistance of the sum of the active resistor, dummy resistor and the fourth means for connecting to make the voltage reading of the means for measuring voltage substantially independent of the value of the sum of these resistances.

2. A strain gage circuit as claimed in claim 1, where all means for connecting are leads which permit the placement of the power supplies and means for measuring voltage in a location remote from that of the active and dummy resistors.

3. A strain gage circuit as claimed in claim 2, wherein the product of the strain gage factor and the resistance factor of the active resistor with respect to changing temperature are substantially constant to provide a constant bridge sensitivity.

4. A strain gage circuit as claimed in claim 3, wherein the active resistor is formed of a platinum tungsten alloy to provide for temperature insensitive measurements.

5. A method for use at any temperature to zero set a strain gage circuit of the type which includes an active resistor and dummy resistor each having two terminals with one terminal of the active resistor being connected to one terminal of the dummy resistor to form a first junction, comprising the following steps:

(a) supplying a first adjustable constant current power supply with two terminals of opposite polarity, (b) supplying a second adjusting constant power supply with two terminals of opposite polarity, (c) connecting one terminal of the first power supply to a like polarity terminal of the second power supply to form a second junction, (d) connecting the unconnected terminal of the first power supply to the unconnected terminal of the active resistor to form a third junction, (e) connecting the unconnected terminal of the second power supply to the unconnected terminal of the dummy resistor to form a fourth junction, (f) connecting the first junction to the second junction, (g) connecting the third and fourth junctions to a means for measuring voltage which draws negligible current, and (h) adjusting the currents flowing from one of the constant current power supplies to produce a zero voltage across the third and fourth junction.

6. A method for temperature compensating a strain gage circuit over a range of temperatures which includes an active resistor and dummy resistor each having two terminals with one terminal of the active resistor being connected to one terminal of the dummy resistor to form a first junction, comprising the following steps:

(a) supplying a first adjustable constant current power supply with two terminals of opposite polarity, (b) supplying a second adjusting constant power supply with two terminals of opposite polarity, (c) connecting one terminal of the first power supply to a like polarity terminal of the second power supply to form a second junction, (d) connecting the unconnected terminal of the first power supply to the unconnected terminal of the active resistor to form a third junction, (e) connecting the unconnected terminal of the second power supply to the unconnected terminal of the dummy resistor to form a fourth junction, (f) connecting the first junction to the second junction, (g) connecting the third and fourth junctions to a means for measuring voltage which draws negligible current in comparison to that flowing through the active resistor, and (h) adjusting the current of one of the power supplies to provide a voltage offset to compensate for a change in resistance of the resistors due to a change in temperature.

* * * * *